Patented Oct. 27, 1931

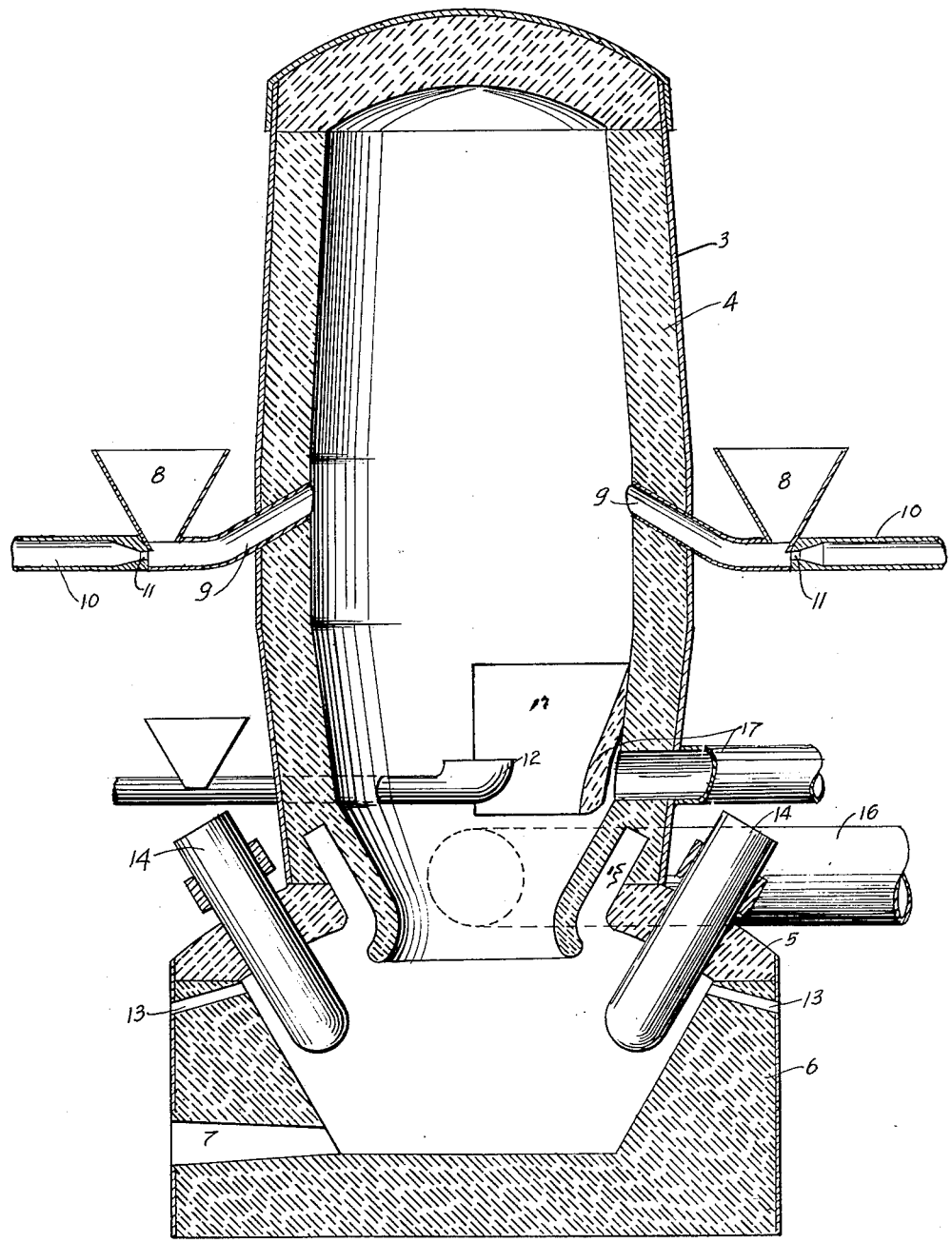

1,829,124

UNITED STATES PATENT OFFICE

LEROY A. WILSON, OF SALT LAKE CITY, UTAH

METALLURGICAL PROCESS

Application filed November 11, 1927. Serial No. 232,666.

This invention relates to a furnace for the smelting of metallic ores, and more especially those of iron, and specifically to a type which employs a combination of the action of burning carbonaceous fuel and the thermal effects of an electric furnace, and has among its objects:

First: To cheapen the cost of electric furnace iron.

Second: To devise a simple but efficient means of reducing metallic oxides.

Third: To employ carbonaceous fuel to supply the preliminary heat and reducing agent and an electric furnace to complete the smelting process.

The single figure of the drawing is a showing in section of a furnace of the type concerned in the present application;

It is to be understood that the drawings are somewhat diagrammatic, as the superstructure would have to be supported by other means than the refractory arch, but to simplify the drawings such features, which are well known and necessary, have been omitted.

It is a well known fact that iron produced in an electric furnace is much superior to that smelted in any other way; the attestations of this is seen in the increasing number of plants devoted to this metallurgical process. One serious drawback is the high cost of electric current, since to reduce one ton of iron ore to metal requires, (theoretically) in round numbers 800 kw. hrs., and to convert this to foundry pig iron an additional 500 kw. hrs., making a total of 1300 kw. hrs. This quantity is based on the assumption of the removal of gangue by magnetic separation before treatment, but will be much higher if slag must be melted. As electric furnaces do not show perfect efficiency the actual consumption will be 40% to 60% more.

To avoid a large share of the above mentioned cost I have devised a process and device to reduce the ore to the metallic state and raise its temperature to or near that of fusion by means of coal of non-coking quality, so that only the final stages of fusion are accomplished by the electrical energy.

The numeral 3 refers to the vertical shaft of my furnace which is of suitable construction to withstand high temperatures, the refractory lining being designated by 4. The exterior of said shaft may be of steel, brick, or any suitable material. The lower portion of shaft 3 is of less diameter than the upper part and is in air tight contact with a refractory arch 5 though, as stated above, the weight of said shaft is not carried by said arch. The basal portion 6 serves as a receptacle for the molten iron, which is tapped off through opening 7.

Hoppers 8 receive the finely pulverized ore, which is blown into the furnace through pipes 9 by a blast through pipes 10 and throats 11; this blast may be of air or preferably of hot CO which has been withdrawn from the interior of the furnace for that purpose. It will be observed that said pipes 9 are tilted up at an angle which will cause the injected ore powder to be thrown up into the top of the shaft.

Finely pulverized coal is blown into said shaft through a nozzle 12 which sprays said coal dust not only vertically, but also laterally thereby filling the upper part of the shaft with a cloud of coal dust which burns instantaneously; however, the quantity of air admitted is restricted so that the greater portion burns to CO instead of to $CO_2$, and it will thus, in its very highly heated condition, abstract oxygen from the powdered ore which is mixed with it and reduce said ore to the metal. Due to the angle at which the powdered ore and powdered coal are injected vigorous turbulence in the coal and ore clouds will ensue and thus the ore will be kept in prolonged contact with the reducing carbon, insuring thorough reduction.

Streams of air are passed through ducts 13 to cool refractory arch 5 and electrodes 14; the air so introduced will become highly heated and will rise into an annular passage 15 whence it will be withdrawn through pipe 16 to a heat exchanger to pre-heat the air used for introducing the powdered coal. The air so withdrawn might itself be employed to introduce said coal, but due to its having been in the furnace its oxygen content may be variable and uncertain and hence the degree of combustion of the coal could not be so accurately controlled. This air may be used to complete combustion of CO withdrawn thru 15 and 16.

A projecting lip 17 is provided to extend over an opening through which CO may be withdrawn from the furnace for use in blowing in the pulverized ore, and thus the reducing process is begun even before the ore is introduced into the furnace, since the highly heated CO will come into intimate contact with the small ore particles while the latter are being forced into the furnace. The lip 17 insures the separation of ore particles from the withdrawn gas, as they will continue to fall and not reverse their direction of travel, as will the gas.

The operation of my furnace is as follows:

Powdered coal is blown through nozzle 12 and is ignited by any suitable means, such as an oil blast, etc., and the said coal is kept burning until the refractory lining 4 has become highly heated and the temperature within the furnace has reached the desired value, about 900° C. The quantity of air is then reduced to obtain CO; by the equilibrium diagram of Baur and Glaessner it is shown that in the presence of an excess of carbon, and at a temperature of 900° C. the result will be 96% CO and 4% $CO_2$. Now a reduction of $Fe_3O_4$ to Fe results with a much lower percentage relation than this, consequently the reduction in my furnace will be practically perfect.

When sufficient CO is present the withdrawal of it is begun and the injection of the powdered ore is started. Such fluxing agents as may be found necessary can be pulverized and introduced, in proper quantity, along with the ore. As both ore and fuel are thrown in vortices into the upper portion of the furnace where the temperature is high the ore particles are retained and completely immersed in an atmosphere of highly heated carbon and CO and are rapidly reduced to the metallic state. They then drop down in a highly heated or even fused condition to the lower part of the furnace where the process is completed by the electric furnace. An arc type of electric furnace is shown but obviously my process may employ any kind that is suitable. If found preferable the temperature produced by the powdered coal may be raised to fuse completely the particles of ore.

Page 170 in "The Electric Furnace for Iron and Steel" by Stansfield, published by McGraw-Hill Book Co., New York, N. Y., shows why my process effects the reduction so readily; it is because the reducing gases move transversely of the ore particles instead of parallel with them; the reference cited shows that but one twentieth the time of the second case is necessary in the first one.

I claim:

1. A metallurgical process comprising the steps of injecting comminuted carbonaceous fuel and ore of a metal into a furnace in an upward direction in such a way as to produce vortical clouds of said particles, and burning said fuel in a deficiency of oxygen while the said particles are suspended in said vortices.

2. In a metallurgical process, the steps of injecting in an upward direction, comminuted fuel and ore of a metal with a blast of heated gas, the said substances being so injected as to be suspended for a time in vortices, and igniting said fuel.

3. In a metallurgical process, the steps of injecting comminuted carbonaceous fuel into a furnace with a blast of pre-heated air, injecting the comminuted ore of a metal with a blast of hot carbon monoxide, the said substances being injected upward at such angles that vortices of particles are formed, burning said fuel while suspended in the vortices, and permitting the particles of said ore to fall into an electric furnace.

4. A metallurgical process, comprising the steps of injecting a stream of comminuted ore into a furnace, the said stream being directed upwardly, the injecting force being supplied by a blast of reducing gas, and injecting an upwardly directed stream of comminuted reducing material which mingles with said ore under conditions of elevated temperature.

5. In a metallurgical process, the steps of injecting into a furnace a stream of comminuted carbonaceous fuel, burning said fuel to carbon monoxide, injecting a stream of comminuted ore into said furnace to mingle with said fuel, with-drawing a portion of said carbon monoxide, placing said carbon monoxide under pressure, and directing a stream of said carbon monoxide against said ore to supply the force of injection.

6. In a metallurgical process, the steps of introducing opposed upwardly directed streams of pulverized ore into a chamber by means of blasts of hot reducing gas, and injecting an upwardly directed stream of comminuted fuel from beneath said ore streams.

7. In a metallurgical process, the steps of introducing opposed upwardly directed streams of pulverized ore into a chamber by means of blasts of hot reducing gas, injecting an upwardly directed stream of comminuted fuel from beneath said ore streams, and burning said fuel in a deficiency of oxygen.

In witness whereof I affix my signature.

LEROY A. WILSON.